United States Patent [19]
Kurtz

[11] 3,919,336
[45] Nov. 11, 1975

[54] METHOD OF PREPARING VINYL CHLORIDE FROM LIQUID ETHYLENE DICHLORIDE

[75] Inventor: Bruce E. Kurtz, Marcellus, N.Y.

[73] Assignee: Allied Chemical Corporation, New York, N.Y.

[22] Filed: Oct. 23, 1973

[21] Appl. No.: 408,975

[52] U.S. Cl. ...... 260/656 R; 260/683 R; 260/659 A
[51] Int. Cl.² .......................................... C07C 21/06
[58] Field of Search .............................. 260/656 R

[56] References Cited
UNITED STATES PATENTS
3,655,787  4/1972  Wiley .......................... 260/656 R
FOREIGN PATENTS OR APPLICATIONS
1,100,616  3/1961  Germany ........................ 260/656 R OTHER PUBLICATIONS
Albright, Chem. Eng., pp. 219–224 & 226, (1967).

*Primary Examiner*—D. Horwitz
*Attorney, Agent, or Firm*—Gerhard H. Fuchs; Jack B. Murray; Gerard P. Rooney

[57] ABSTRACT

A process is disclosed for the production of vinyl chloride from ethylene dichloride by intimately contacting liquid ethylene dichloride and a hot gaseous stream essentially unreactive with ethylene dichloride when the hot unreactive gaseous stream is at a temperature sufficient to convert the liquid ethylene dichloride to vinyl chloride, preferably between about 600°C. and 1000°C.

15 Claims, 1 Drawing Figure

PRODUCTION OF VINYL CHLORIDE FROM ETHANE

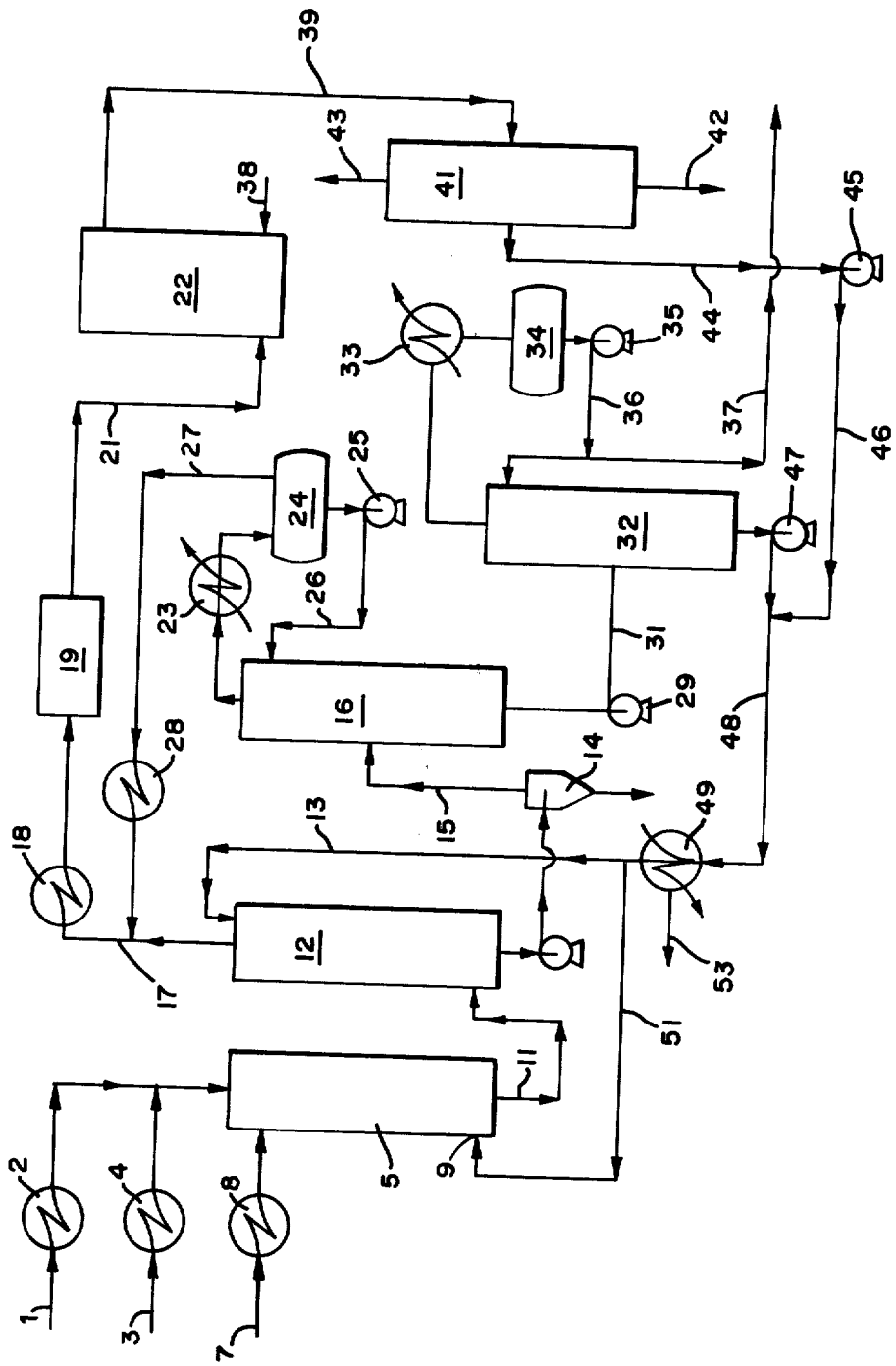

METHOD OF PREPARING VINYL CHLORIDE FROM LIQUID ETHYLENE DICHLORIDE

BACKGROUND OF THE INVENTION

The technology for producing vinyl chloride has undergone major changes in the past decade. Until the mid-1960's vinyl chloride was generally manufactured by the hydrochlorination of acetylene. Acetylene, however, is substantially more costly than ethylene. Hence, strong motivation existed to develop a process based entirely on ethylene. Such a process was successfully developed in the past, having as its key step, the oxyhydrochlorination of ethylene to ethylene dichloride. As a result, the acetylene-based process has, in recent years, been almost completely replaced by the more economical ethylene-based process. Because ethane is less expensive than ethylene, effort is being expended to develop a commercially successful ethane-based process for production of vinyl chloride from cracking of ethylene dichloride.

SUMMARY OF THE INVENTION

It has now been found that a hot gaseous stream which is essentially unreactive to ethylene dichloride and which is at a temperature sufficient to convert the liquid ethylene dichloride to vinyl chloride is intimately contacted, e.g. by quenching, with liquid ethylene dichloride, ethylene dichloride is cracked to vinyl chloride. The term "unreactive" refers herein to a gaseous stream that is essentially inert with respect to reaction with ethylene dichloride and its cracked products, i.e. vinyl chloride and hydrogen chloride, at the prevailing conditions of the intimate contact zone or quench zone. Vinyl chloride is subsequently recovered as relatively pure product.

Preferably and more particularly, when ethane is subjected to autothermic cracking in the presence of specified amounts of oxygen and chlorine and under specified conditions of time and temperature, and when the reaction products are quenched with ethylene dichloride, thus cooling the reactants by its vaporization, ethylene dichloride is simultaneously cracked in situ to produce vinyl chloride product. "Autothermic" cracking as defined herein is cracking which does not require the continuous input of large quantities of heat. The reaction and quenching conditions can be controlled, so that the hydrogen chloride produced by autothermic cracking and that produced by the subsequent thermal cracking of the ethylene dichloride quench is substantially sufficient for combination with the ethylene produced by autothermic cracking to provide the ethylene dichloride required for the quench.

Briefly, the method of this invention for the production of vinyl chloride from ethylene dichloride is as follows: liquid ethylene dichloride is intimately contacted with a hot gaseous stream which is essentially unreactive with ethylene dichloride when the hot unreactive gaseous stream is at a temperature which is sufficient to convert the liquid ethylene dichloride to vinyl chloride preferably between about 600°C. and 1000°C.

A preferred method of this invention for the production of vinyl chloride involves the following steps: Ethane, chlorine and oxygen are introduced, preferably after preheating, as reactants into an autothermic reaction zone in controlled proportions, with a molar ratio of chlorine:ethane of from about 0.2 to 1.2:1, preferably between about 0.4:1 and 0.6:1, and a molar ratio of oxygen:ethane of from about 0.005 to 0.5:1, preferably between about 0.1:1 and 0.4:1. The term "oxygen" herein means oxygen gas or an oxygen-containing gas, such as air. The reactants are maintained in the reaction zone at a temperature ranging from above 700°C. to below 1000°C., preferably between about 850°C. and 950°C., for a time period of from about 0.1 to 10 seconds, preferably between about 0.25 and 2.5 seconds. The autothermic reaction product stream comprises a major part of ethylene and hydrogen chloride and a minor part of water, methane, carbon monoxide, hydrogen and acetylene. Thereafter, the autothermic reaction product gas stream is quenched with ethylene dichloride.

The ethylene dichloride quench can be added to the autothermic reaction products after such products leave the autothermic reaction zone, or preferably can be introduced directly into the autothermic reaction zone at a point after the autothermic reaction products have been retained at a temperature from about 700°C. to below 1000°C. for a time period ranging from about 0.1 to 10 seconds. The reactive ethylene dichloride is vaporized and cracked to vinyl chloride and hydrogen chloride by means of heat supplied by the autothermic reaction products. A quenched product comprising ethylene, hydrogen chloride, vinyl chloride and unreacted ethylene dichloride is obtained. Thereafter vinyl chloride is recovered as product. Preferably, the ethylene dichloride quench is maintained under conditions such that the conversion of the ethylene dichloride to vinyl chloride is less than 90%, more preferably from about 40 to 60%. It is also preferred that the ethylene dichloride quench decreases the temperature to the autothermic reaction product stream to below about 500°C., preferably between about 300°C. and 400°C.

A preferred means of recovery of vinyl chloride product is as follows: The vinyl chloride produced by the ethylene dichloride quenching, and at least part of the hydrogen chloride produced thereby is absorbed in ethylene dichloride. Thereafter ethylene and hydrogen chloride is separated from the vinyl chloride and the ethylene dichloride absorbent. The vinyl chloride is then further separated as product from the ethylene dichloride absorbent. The ethylene and hydrogen chloride is reacted in the presence of oxygen by oxyhydrochlorination to produce more ethylene dichloride. Recovered ethylene dichloride is recycled as quench and as absorbent for vinyl chloride. More preferably, the separated ethylene and hydrogen chloride is passed through a catalytic hydrogenator prior to producing ethylene dichloride by oxyhydrochlorination so as to hydrogenate any acetylene present to ethylene.

BRIEF DESCRIPTION OF THE DRAWING

The accompanying diagram illustrates the manner in which vinyl chloride can be produced in high yield by means of a hot unreactive gaseous stream maintained at temperatures between about 600°C. and below 1000°C. used in combination with subsequent quenching by liquid ethylene dichloride. Ethylene dichloride is introduced as a quench preferably into the exit end of the reactor.

In the diagram, chlorine in line 1 which is preheated at 2, and oxygen in line 3, which is preheated at 4, are introduced together into reactor 5. Ethane gas in line 7 is preheated at 8 and enters reactor 5 simultaneously with the hot gaseous mixture of chlorine and oxygen. Autothermic cracking occurs and the autothermic reaction product stream is immediately quenched by a stream of ethylene dichloride entering the outlet end of the reactor at 9. The ethylene dichloride is vaporized by the hot gases and heated to a temperature at which cracking of the ethylene dichloride to vinyl chloride and hydrogen chloride occurs. The vaporized cracked mixture leaves the reactor at 11 and enters absorbing tower 12 where the gases contact additional liquid ethylene dichloride entering through line 13. The ethylene dichloride entering at line 13 absorbs essentially all of the vinyl chloride. Removal of particulate carbon is accomplished by diverting the ethylene dichloride absorbent containing vinyl chloride and hydrogen chloride through a liquid cyclone or similar device 14. This vinyl chloride-rich absorbent next passes through line 15 to distillation or fractionation column 16.

Hot exit gases from the absorber 12 leaving through line 17 contain primarily ethylene and hydrogen chloride together with lesser amounts of unconverted ethane, acetylene, methane, hydrogen, carbon monoxide, and also nitrogen if air is used as a source of oxygen. These gases are heated at 18 and passed through a catalytic hydrogenator 19 to convert any acetylene present to ethylene. The gases then pass through line 21 to oxyhydrochlorinator 22.

Returning our attention to distillation column 16, hydrogen chloride is fractionated from the vinyl chloride-rich ethylene dichloride and condensed by refrigerated condenser 23 for collection in reflux drum 24. A portion of the hydrogen chloride is returned to the distillation column 16 through pump 25 and line 26 as reflux. Cooled hydrogen chloride (HC1) passes from reflux drum 24 through line 27 and is warmed by heat exchanger 28 and combined with the exit gases from absorber 12 on their way to the catalytic hydrogenator 19 and oxyhydrochlorinator 22. Heat exchanger 28 can, if desired, be arranged for heat exchange with the ethylene dichloride in line 13 en route to absorber 12. Thus the ethylene dichloride would be cooled by the cool HC1 vapor, while raising the temperature of the HC1. This HC1, together with the exit gases, are further heated by heat exchanger 18, which, if desired, may obtain its heat by being enclosed in a cabin-type furnace together with the reactor 5. The bottom stream from the first distillation column 16 containing ethylene dichloride and vinyl chloride is pumped by 29 through line 31 to a second distillation or fractionation column 32. Vinyl chloride is distilled off, condensed by heat exchanger 33 and collected in reflux drum 34 from which it is pumped at 35 through line 36. A portion of this stream is diverted and returned to fractionating column 32 as reflux. The balance of this stream is removed through line 37 as final product vinyl chloride. The bottom stream from the second distillation column 32 contains ethylene dichloride and is pumped through pump 47 and line 48.

Returning now to the oxyhydrochlorinator 22 which may be of the fixed or fluid bed variety, ethylene and HC1 are received through line 21 and air (or oxygen) is introduced at line 38. Ethylene dichloride as product of the oxyhydrochlorination passes through line 39 to recovery system 41. Water and traces of unreacted HC1 are removed at line 42, and non-condensibles are removed at line 43. At this point the non-condensibles may comprise carbon monoxide, unreacted ethane, methane, ethylene and oxygen. Nitrogen will also be present if air has been used as a source of oxygen. If substantially pure oxygen gas has been employed, the ethane after removal of carbon monoxide and purging of methane may be recycled to the auto-thermic cracking reactor 5. The separated ethylene dichloride leaves the recovery system at 44 and is pumped by pump 45 through line 46 for combination in line 48 with that ethylene dichloride pumped by 47 from the second distillation column 32. The combined ethylene dichloride is cooled by heat exchanger 49. One part of ethylene dichloride is diverted through line 51 to autothermic reactor 5 as quench, another part of the ethylene dichloride is transferred through line 13 to absorber 12 as the absorbent and a third part is withdrawn from heat exchanger 49 through line 53 to either a storage unit (not shown) for subsequent sale or a reactor (not shown) for conversion of ethylene dichloride to vinyl chloride by conventional means.

DESCRIPTION OF THE PREFERRED EMBODIMENT

The vinyl chloride process of the present invention involves the intimate contacting of liquid ethylene dichloride and a hot gaseous stream unreactive with ethylene dichloride at an unreactive gaseous stream temperature sufficient to convert the liquid ethylene dichloride to vinyl chloride. Thereafter, the vinyl chloride may be recovered as product by any conventional means. Conventionally, ethylene dichloride is cracked to vinyl chloride at a temperature ranging between 500°C. and 600°C. The preferred unreactive gaseous stream temperature for purposes of our invention is between about 600°C. and 1000°C. The unreactive gaseous stream preferably comprises the reaction products from the cracking reaction of ethane, chloride and oxygen. These reaction products are primarily ethylene and hydrogen chloride. The use of such reaction product stream is preferred primarily because the exit gas stream's sensible heat content which would otherwise be lost is recovered and because vinyl chloride may be continuously produced without the need for an outside supply of ethylene dichloride.

A preferred embodiment of the process of the present invention involves the autothermic cracking of ethane to ethylene in combination with the subsequent thermal cracking of ethylene dichloride to vinyl chloride through the use of an ethylene dichloride quench. In addition to ethylene and hydrogen chloride, various by-products of the autothermic cracking step are formed in minor quantities, including water, acetylene, methane, hydrogen, carbon monoxide, and elemental carbon. The by-products which account for the greatest reduction in yield are methane and carbon monoxide. The small amounts of acetylene which form under some conditions can be converted to ethylene by hydrogenation; so acetylene does not necessarily represent a reduction in yield.

In carrying out the preferred embodiment of our invention, chlorine, oxygen (or air) and ethane may be pre-heated by means of heat exchangers to a temperature preferably between 300°C. and 600°C. before passage into the autothermic cracking zone. It is preferable to avoid temperatures above 600°C. for ethane so as to prevent thermal cracking and to avoid temperatures above 400°C. for chlorine so as to protect the processing equipment from corrosion. At the elevated temperatures chlorine becomes highly corrosive. The preferred method of carrying out the autothermic cracking step is disclosed in greater detail in co-pending application Ser. No. 408,956, filed Oct. 23, 1973, which disclosure is specifically incorporated herein by reference.

The reactants are maintained in the reaction zone for at least about 0.1 second, preferably between about 0.25 to 2.5 seconds, or for a time sufficient to convert concomitantly from about 20 to 98 percent of the ethane to 100 to 70 percent of the ethylene, respectively, based on the converted ethane.

The conversion and yields obtained are much better at temperatures ranging from above about 700°C. to below 1000°C. and retention times of from about 0.1 to 10 seconds than when the autothermic cracking step is carried out at temperatures in excess of 1000°C. with retention times of less than 0.1 second. The percent conversion of ethane and the percent ethylene yield, based on the ethane converted, bear approximately an inverse relationship.

The molar ratio of chlorine:ethane ranges preferably between from about 0.4 to 0.6:1 for the recovery of vinyl chloride. The theoretical chlorine/ethane molar ratio for the production of vinyl chloride is 0.5:1. Chlorine/ethane ratios higher than 0.6 can be used. However, more hydrogen chloride will be produced in the autothermic cracking step than is required for subsequent oxyhydrochlorination of ethylene when the chlorine/ethane ratio is greater than 0.6. To avoid an excess of hydrogen chloride in the production of vinyl chloride, it is preferable to keep the molar ratio of chlorine:ethane below about 0.6:1. Ratios below 0.4:1 may be used if desired and high yields may be obtained, but the need for recycling ethane increases as the ratio of chlorine:ethane is lowered.

The mol ratio of the oxygen:ethane in the autothermic reaction zone feed is in the range of about 0.005 to 0.5:1, preferably about 0.1 to 0.4:1. The lower ratios improve the ethylene yield by reducing carbon monoxide and methane formation, but also decrease the heat of reaction. The use of these lower ratios requires that the reactants be preheated to a higher temperature. The residence time in the reactors themselves is so short that little heat can be transferred there. Hence we depend on the heat of reaction to raise the reactants to the desired reaction temperature. If the oxygen-to-ethane ratio is adjusted downward to give a near zero heat of reaction, then the reactant preheat temperatures are preferably such that the desired reactor temperature is attained before introduction of the reactants into the reactor. In general, this is not very practical, so that the oxygen-to-ethane ratio is preferably kept high enough to give a significant temperature rise due to heat of reaction. This temperature rise is increased by using substantially pure oxygen gas rather than air, so that required preheat temperatures are then reduced.

The autothermic reaction product gaseous stream is next quenched with liquid ethylene dichloride. "Quenching" as used herein refers to the intimate contact of a hot gaseous stream and liquid ethylene dichloride for the dual purpose of cooling the gaseous mixture and of simultaneously vaporizing and cracking the liquid ethylene dichloride to vinyl chloride, The gaseous stream is essentially unreactive chemically with ethylene dichloride quenching. The heat of the gaseous stream serves to vaporize the liquid ethylene dichloride and thereafter to crack the vaporized ethylene dichloride to vinyl chloride. In turn, the vaporization and cracking of the ethylene dichloride serves to cool the gaseous stream. The cracking of the ethylene dichloride to vinyl chloride is an endothermic reaction and occurs according to the following equation:

$$C_2H_4Cl_2 \rightarrow C_2H_3Cl + HCl.$$

Throughout the reactive portion of the quenching, the unreactive autothermic reaction product stream is at a temperature sufficient to convert ethylene dichloride to vinyl chloride. This conversion temperature may range from 400°C. to 1000°C. To enhance compatibility with the efficiency of our overall process, the preferred conversion temperature is maintained between about 700°C. and 1000°C. Conversion of ethylene dichloride to vinyl chloride cools the gaseous stream to a temperature below about 500°C., preferably from 300°C. to 400°C. The rate of cooling may be controlled by varying flow rate of ethylene dichloride quench and by varying the surface area of contact between the ethylene dichloride and the unreactive gaseous stream. The amount of ethylene dichloride fed as quench liquid should be regulated so that not all of the ethylene dichloride quench is cracked. The conversion of ethylene dichloride to vinyl chloride is maintained preferably at less than about 90%, more preferably between about 40% and 60%, so as to minimize carbon formation and to preclude reactor plugging. The preferred ethylene dichloride quenching time ranges between 0.5 and 10 seconds.

The point of introduction of the quench is an important factor in establishing the residence time of the reactants in the reactants in the reaction zone. The ethylene dichloride can be added to the reaction mixture as it leaves the reaction zone, or injected directly into the reaction zone at a point to permit the desired retention time at the desired autothermic reaction temperatures before quenching. Good results have been obtained by introducing the quench directly into the reactor at a point opposite that at which the pre-heated reactants are introduced.

The quenched gases exiting the quenching zone comprises the products of the reaction between ethane, chlorine and oxygen together with vaporized ethylene dichloride, vinyl chloride and hydrogen chloride from the cracking of ethylene dichloride. The exit gases may flow to an absorber or absorption zone or tower for contact with additional liquid ethylene dichloride which absorbs substantially all of the vinyl chloride and some portion of the hydrogen chloride. The exit gases from the absorption tower may be reheated by a heat exchanger to at least about 150°C. to 200°C. This exchanger may if desired be included in a "hot box" or cabin furnace with other heat exchangers. The gases next may pass to a conventional catalytic hydrogenator for the conversion of any acetylene present to ethylene.

The gases exiting the catalytic hydrogenator then may pass to a conventional oxyhydrochlorinator. This oxyhydrochlorinator may also be fed with at least the stoichiometric amount of oxygen, or air with the quantity of oxygen ranging from about the stoichiometric amount to an excess of 100 percent or more. In the oxyhydrochlorinator the following reaction occurs:

$$C_2H_4 + 2HCl + \tfrac{1}{2} O_2 \rightarrow C_2H_4Cl_2 + H_2O.$$

The oxyhydrochlorination proceeds at temperatures preferably between about 200°C. and 250°C. Hydrogen chloride obtained from the subsequent stripping of the ethylene dichloride absorbent solution may also be passed into the oxyhydrochlorinator.

The products of the oxyhydrochlorination reaction may pass to a conventional recovery system having distillation or stripping columns. Water and non-condensibles are separated. Non-condensibles may include ethane, methane, carbon monoxide, nitrogen and oxygen. If substantially pure oxygen gas rather than air has been used in the process, the ethane obtained may be returned after removal of carbon dioxide as recycle to the autothermic cracking reactor. Part of the recovered ethylene dichloride may be sent to the reactor as quench, part may be delivered to the absorption tower as absorbent, and part may be withdrawn for sale or conversion to vinyl chloride by conventional means.

The ethylene dichloride absorbent solution in the absorption tower, containing vinyl chloride and hydrogen chloride, is circulated through a separator such as liquid cyclone separator, wherein particulate carbon is removed. The ethylene dichloride absorbent solution is then sent to a first distillation unit wherein the absorbed hydrogen chloride is stripped and combined with the gas stream enroute from the absorber to the hydrogenator and then to the oxyhydrochlorinator. The remaining stripped ethylene dichloride solution next passes to a second fractionating column where vinyl chloride is recovered as product. The ethylene dichloride bottoms of the second fractionating column combined with the ethylene dichloride from the oxyhydrochlorination recovery system for transmission may be handled as stated above.

With careful adjustment of the molar ratio of chlorine to ethane in the autothermic reactor it will be found that the hydrogen chloride from the reactor, part of which oasses through the absorbent, and part of which is subsequently stripped from the absorbent, will equal that required in the oxyhydrochlorination step.

EXAMPLE 1

Ethane is preheated to 500°C. and introduced into an autothermic cracking reactor at the rate of 12.5 grams per minute (g/m). The chlorine and oxygen are preheated to 400°C. and introduced into the reaction chamber simultaneously with the introduction of the ethane at a chlorine-to-ethane molar ratio of 0.57:1 and at an oxygen-to-ethane molar ratio of 0.10:1. The autothermic reaction residue time is 0.31 seconds. Ethane conversion is approximately 80.6%, and ethylene yield is approximately 79.2%.

The autothermic reaction product gas stream, at a temperature of 925°C., is quenched with a stream of ethylene dichloride. The ethylene dichloride quench is introduced into the lower end of the reaction chamber at a rate of 41 grams per minute as a quench. A thermocouple well extends into the reaction zone for temperature determinations. The temperature of the cooled cracked product after quenching is 300°C.

Of the ethylene dichloride introduced as quench, about 50% is converted to vinyl chloride, with negligible formation of by-products. Conversion and yield of ethane to ethylene was substantially unaffected in comparison to test runs conducted without ethylene dichloride quenching.

The hot vapors comprising predominantly vinyl chloride, ethylene, ethylene dichloride and hydrogen chloride are passed from the reactor after quenching to an absorber where such vapors come in contact with circulating ethylene dichloride. The circulating ethylene dichloride absorbs the ethylene dichloride vapor, the vinyl chloride and part of the hydrogen chloride, but does not appreciably absorb the ethylene or the lesser by-products, such as acetylene and methane. The ethylene is reheated to 175°C. and sent to the catalytic hydrogenator interposed between the absorber and the oxyhydrochlorinator so as to hydrogenate the trace of acetylene present to ethylene. This catalytic hydrogenator is packed with palladium catalyst deposited on an activated alumina support.

The ethylene dichloride solution containing vinyl chloride and the balance of the hydrogen chloride is stripped of hydrogen chloride by fractional distillation. This hydrogen chloride is combined with the portion which did not dissolve in the ethylene dichloride absorber. Because of careful control of the chlorine input to the reactor, the hydrogen chloride from both sources, when combined, is substantially sufficient to supply the HCl requirement of the oxyhydrochlorination step, without leaving an unwanted excess. The oxyhydrochlorination proceeds in a fluid bed catalytic oxyhydrochlorinator employing a copper chloride catalyst on an alumina support at 225°C. The product ethylene dichloride is separated from non-condensibles and water.

The ethylene dichloride absorbent from which hydrogen chloride has been stripped is fractionated in a distillation column to obtain vinyl chloride as a final product. The remaining ethylene dichloride is combined with that from the oxyhydrochlorinator which has been freed of non-condensibles and water. Part of this recovered ethylene dichloride is recycled as quench, and a part is recycled as absorbent, and part is withdrawn for further processing. The methane content is reduced by purging, while carbon monoxide is removed by scrubbing with cuprous chloride solution. The ethane is recycled to the reactor. An overall yield of vinyl chloride based on ethane is 75%. Yield of vinyl chloride based on ethylene dichloride is 96%.

Since changes may be made in carrying out the above process without departing from the scope of the invention, it is intended that all matter contained in the above description shall be interpreted as illustrative and not in a limiting sense.

I claim:
1. A process for the production of vinyl chloride from ethylene dichloride, which comprises the steps of:
   a. intimately contacting a liquid ethylene dichloride quench and a hot gaseous stream essentially unreactive with ethylene dichloride, wherein the hot unreactive gaseous stream consisting essentially of ethylene and hydrogen chloride is at a temperature sufficient to convert the liquid ethylene dichloride to vinyl chloride; and
   b. recovering the converted vinyl chloride.
2. The process of claim 1 wherein the unreactive gaseous stream temperature ranges between about 600°C. and 1000°C.
3. The process of claim 1 wherein the unreactive gaseous stream is formed by a reaction of ethane, chlorine and oxygen.
4. The process of claim 1
   wherein the unreactive gaseous stream is formed by reacting a gaseous mixture of ethane, chlorine and oxygen as reactants in an autothermic cracking reaction zone under auto-thermic cracking conditions sufficient to convert the reactants to an autothermic reaction product stream comprising ethylene and hydrogen chloride.

5. The process of claim 4 wherein the autothermic cracking conditions include a temperature from about 700°C. to below 1000°C. and time period of from about 0.1 to 10 seconds.

6. The process of claim 4 wherein the molar ratio of chlorine:ethane is from about 0.2 to 1.2:1 and the molar ratio of oxygen:ethane is from about 0.005 to 0.5:1.

7. The process of claim 4 wherein the ethylene dichloride quench is maintained under conditions such that the conversion of the ethylene dichloride to vinyl chloride is less than 90%.

8. The process of claim 4 wherein the ethylene dichloride quench is maintained under conditions such that the conversion of the ethylene dichloride to vinyl chloride ranges from about 40 to 60%.

9. The process of claim 4 wherein the ethylene dichloride quench decreases the temperature of the autothermic reaction product stream to below about 500°C.

10. The process of claim 4 wherein the ethylene dichloride quench is introduced directly into the autothermic reaction zone at a point to cool the temperature of the reaction mixture to below about 500°C. after the reactants have been retained at a temperature of from about 700°C. to below 1000°C. for a time period ranging from about 0.1 to 10 seconds.

11. The process of claim 4 wherein the ethylene dichloride quench decreases the temperature of the autothermic reaction products to between about 300°C. and 400°C.

12. The process of claim 4 wherein the process is continuous, the molar ratio of chlorine:ethane is maintained between about 0.4:1 and 0.6:1, and the molar ratio of oxygen:ethane is maintained between about 0.1:1 and 0.4:1.

13. The process of claim 4 wherein the autothermic reaction zone reactants are maintained in the autothermic reaction zone at a temperature of between about 850°C. and 950°C. for a time period of between about 0.25 and 2.5 seconds.

14. The process of claim 4 wherein the chlorine, oxygen and ethane are preheated.

15. The process of claim 4 wherein the vinyl chloride produced by quenching and at least part of the hydrogen chloride produced thereby is absorbed in an ethylene dichloride absorbent; ethylene and hydrogen chloride is separated from the vinyl chloride and the ethylene dichloride absorbent; vinyl chloride is recovered as product by separating the vinyl chloride from the ethylene dichloride absorbent; additional ethylene dichloride is produced by oxyhydrochlorination of ethylene in the presence of hydrogen chloride and oxygen; and the ethylene dichloride product and the separated ethylene dichloride absorbent is recycled for use both as quench and as absorbent in said process.

* * * * *